Oct. 7, 1947.   W. W. WAGNER   2,428,481
COOKING OR PROCESSING APPARATUS
Filed March 7, 1944   3 Sheets-Sheet 1

Inventor,
Wiltz W. Wagner,
By Baldwin & Wight
his Attorneys.

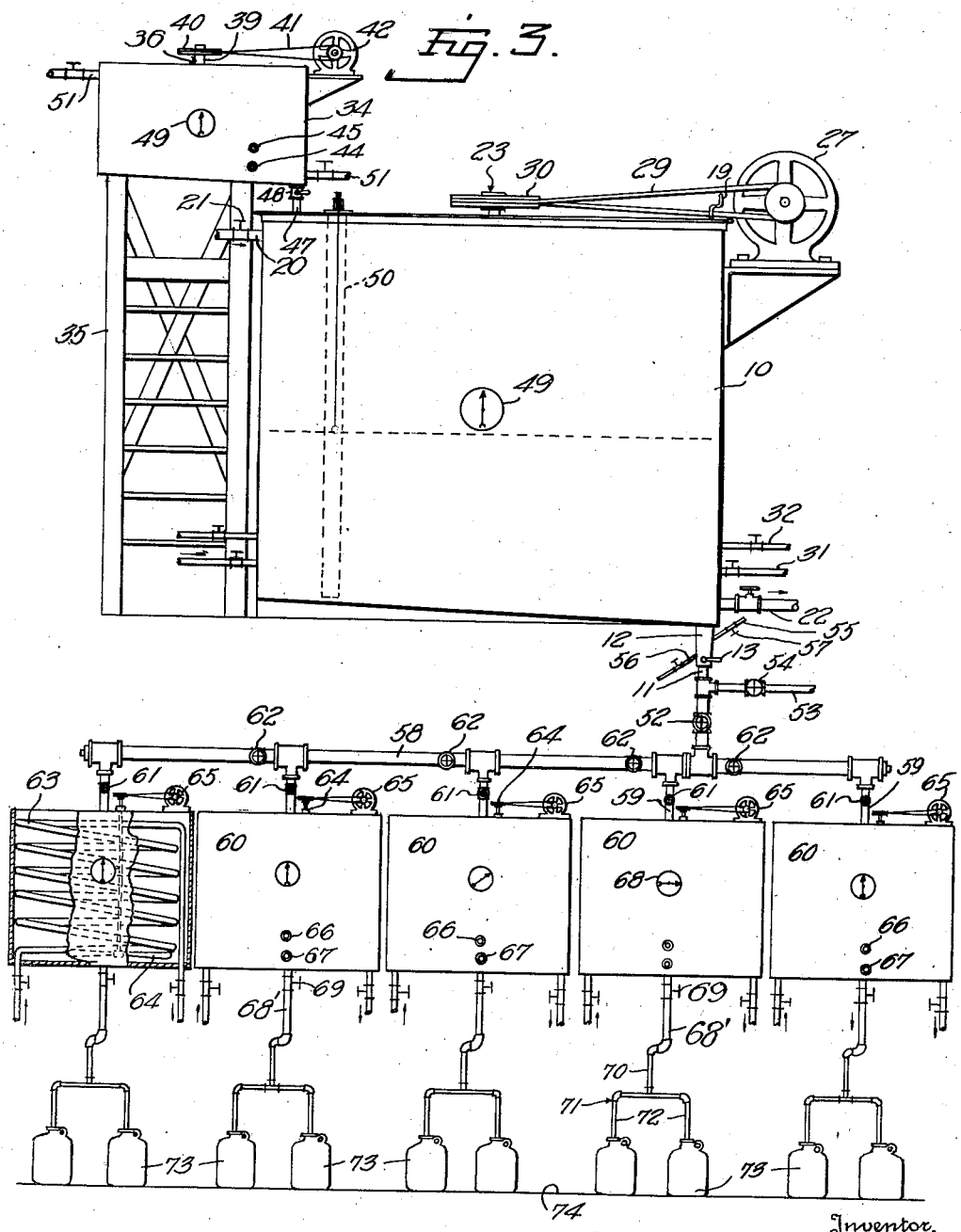

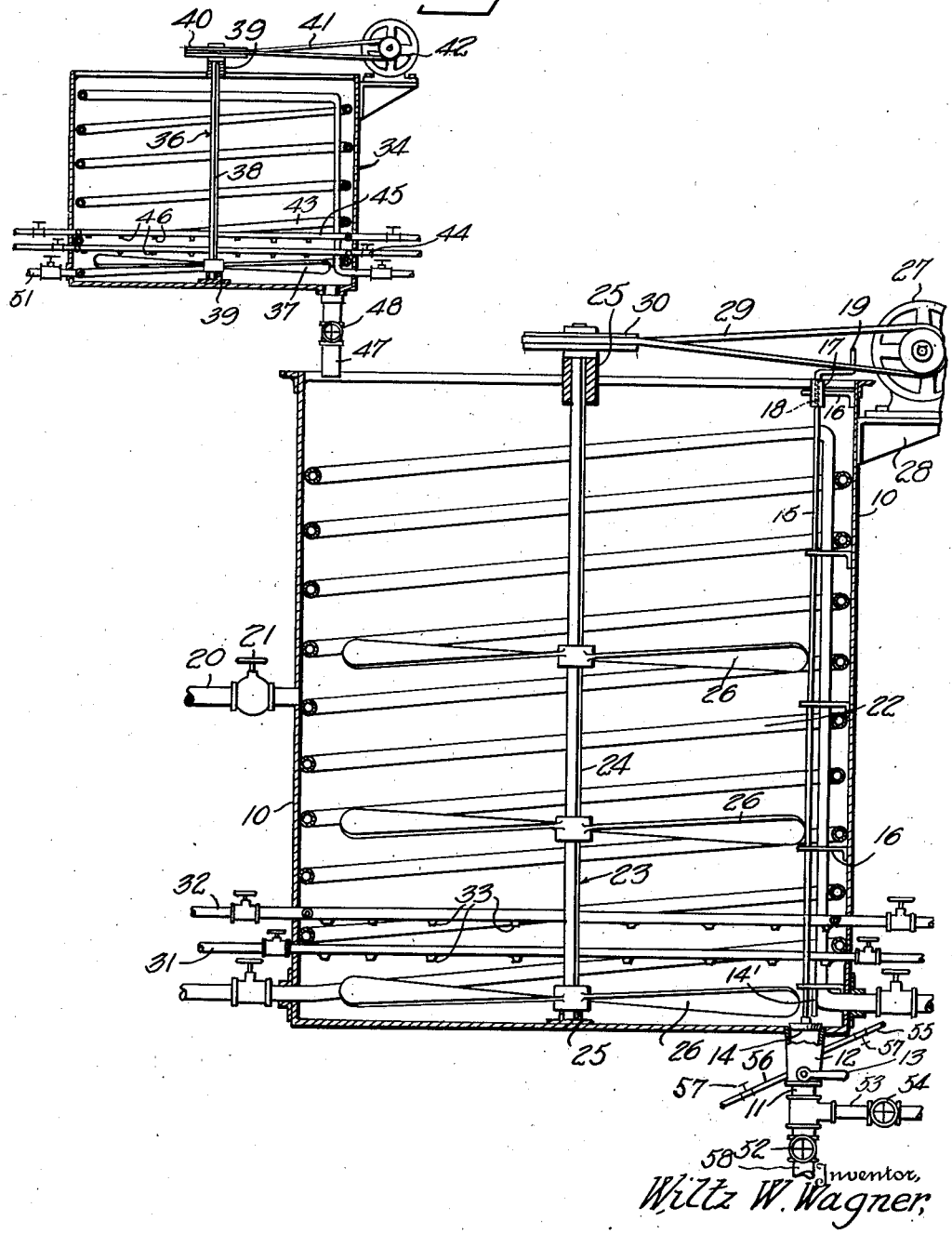

Patented Oct. 7, 1947

2,428,481

UNITED STATES PATENT OFFICE 2,428,481

COOKING OR PROCESSING APPARATUS

Wiltz W. Wagner, New Orleans, La.

Application March 7, 1944, Serial No. 525,472

1 Claim. (Cl. 99—348)

This invention relates to systems or apparatus for cooking or processing large quantities of fluent materials such as fountain or other syrup, fountain fruits, preserves, pie fillings, jellies, soup and vegetables or the like, and for expeditiously filling containers with the cooked or processed materials.

An object of the invention is to provide a system or apparatus of the kind referred to which includes a mixing tank equipped with temperature control and agitating means and which is adapted to have valved communication with a main cooking tank, the arrangement being such as to enable materials to be given a preliminary mixing or treatment when desired before being deposited in the main cooking tank.

Another object is to provide a main cooking tank or vessel having improved equipment for heating or cooling and agitating the contents and from which the processed materials may selectively be filled directly into containers, or discharged into storage tanks, which latter may be provided with heating and agitating equipment.

Another object of the invention is to provide storage tanks of the kind referred to so constructed or equipped as to permit independent treatment of separate batches of material received from the main tank, which will provide for the independent storage of a separate batch or batches of material overnight or longer, and from which the cooked or processed materials may be discharged into containers.

Another object of the invention is to provide improved means for discharging material from a tank and means for maintaining the discharging means clear of obstructions so as to promote free flow.

A further object of the invention is to provide means for enabling the expeditious operation of all units or auxiliary parts with a minimum of labor, and conveying mechanism for transporting the containers away from the filling tanks to equipment for capping, washing, and/or sterilizing the containers and finally labeling them.

Other objects will become apparent from a reading of the following description, the appended claim, and the accompanying drawings in which:

Figure 3 is a view in elevation looking toward the tanks or cooking equipment from a position between the latter and the conveyor; and Figure 4 is a substantially central vertical sectional view on an enlarged scale, taken through the mixing tank and main tank.

Figure 1:
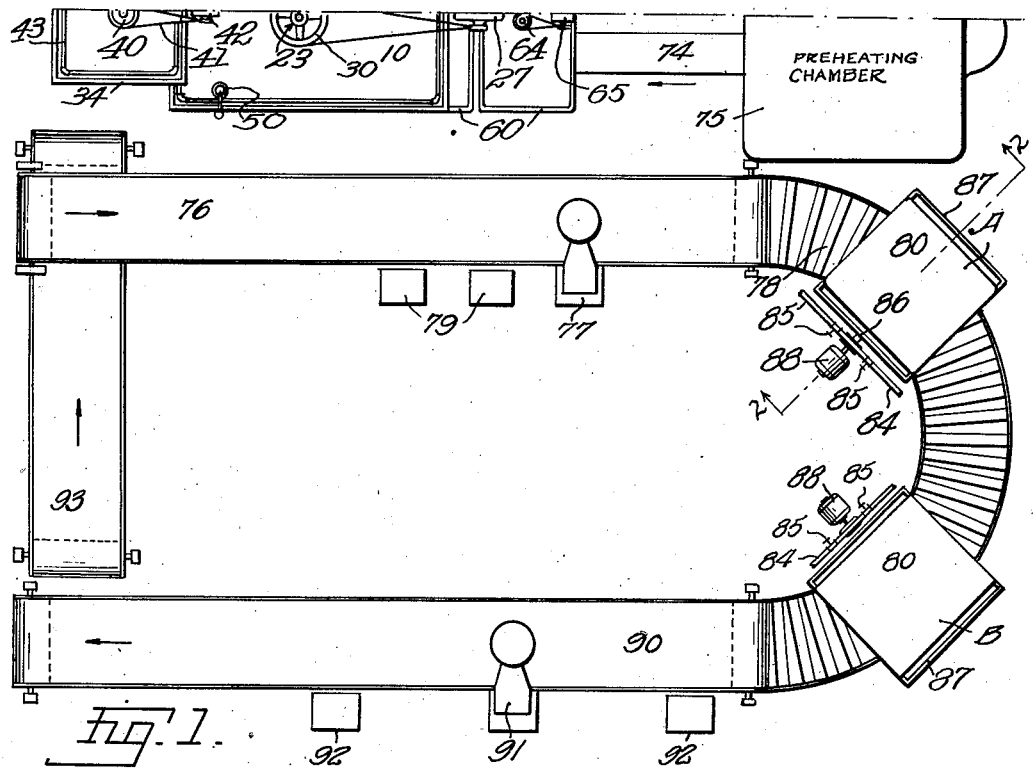
Figure 1 is a plan view of the system or apparatus.
Figure 2:
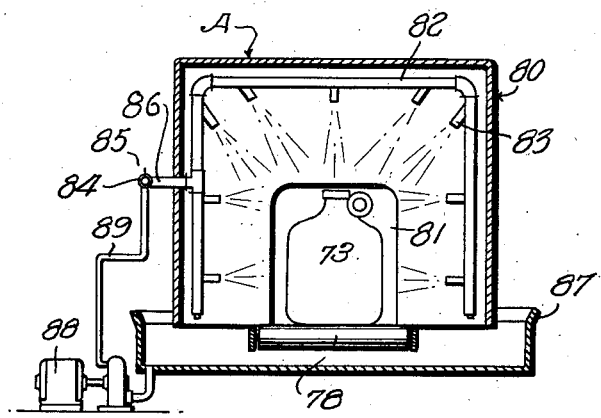
Figure 2 is a vertical section taken on the line 2—2 of Figure 1.

In the embodiment shown for the purposes of illustration a main cooking or processing tank or vessel indicated at 10 is provided with an outlet or discharge conduit 11 which preferably includes a funnel-shaped or hopper-shaped portion 12 directly connected to the tank 10. Flow of material from the tank through the conduit 11 is controlled by a valve 13 preferably located within the hopper-shaped portion 12 and may also be controlled by a disk or plug valve 14 adapted to seat on the hopper portion 12 at the upper end thereof. The valve 14 is fastened to the lower end of an operating rod or stem 15 journaled and guided for vertical movements by brackets 16 extending inwardly from the wall of the tank 10. One of the brackets 16 carries a stationary nut or sleeve 17 which receives a screw-threaded portion 18 of the rod 15 so that the stem 15 and consequently the valve 14 may be raised or lowered by turning of a crank 19 on the upper end of the rod 15. Raising of the valve 14 is limited, say to a few inches, by a suitable stop member 14' which may be mounted on the lowermost of the brackets 16.

Water may be supplied to the tank 10 through a pipe 20 under control of a valve 21 and materials to be processed in the tank 10 may be introduced into its top which is open. Since the tank 10 is to be used at times as a cooking vessel it is provided with a heating coil 22 of the type wherein all of the coil parts may be supplied with heating medium simultaneously or, alternatively, only a portion of the coil parts may be supplied with the heating medium, whereby the heat available for processing the contents may be varied. The coils 22 may be connected either to a source of heating medium, such as steam, or cooling medium depending upon the nature of the treatment to be accomplished. The coil 22 preferably is adapted to be placed in communication either with a source of steam supply, refrigerant, or city water supply.

Materials being processed in the tank 10 may be agitated by a rotatable mechanical agitator generally designated 23 and including a vertical shaft 24 journaled in bearings 25 and propeller-like blades 26 extending radially from the shaft at different elevations. The shaft may be driven by any suitable means, such as an electric motor 27 mounted on a bracket 28 secured to the tank 10. The motor 27 drives a belt 29 which is trained over a pulley 30 secured to the shaft 24.

Also mounted within the tank 10 are coils or pipes 31 and 32 adapted to be supplied under valve control with steam and compressed air, respectively. The pipes 31 and 32 are provided with nozzles 33 all pointing downwardly so as to direct fluid jets against the bottom of the tank 10. The mechanical agitator 23 and the steam and air agitators 31 and 32 may be used selectively, any of them in combination, or all simultaneously, according to the conditions and processing desired. The bottommost agitator blades 26 are mounted to rotate in a plane adjacent the bottom of the tank 10 and the jet agitator nozzles 33 are disposed above this plane and are arranged to direct jets of agitating fluid downwardly into the path of rotation of the blades. The agitation caused by the jets and by the blades 26 is of a compound nature and is extremely effective in preventing accumulation of heavier matter at the bottom of the tank.

The apparatus often is used for the rapid cooking of large quantities of materials some of the ingredients of which require mixing before being deposited in the main tank 10. A preliminary mixing tank 34 is provided for effecting the desired preliminary mixing when required and is adapted to discharge preliminarily mixed materials directly into the top of the tank 10. Preliminary mixing is especially advantageous in processing certain ingredients used in the manufacture of jelly and in the dissolving of cocoa. The tank 34 preferably is mounted at a level higher than that of the tank 10 and may, for example, be mounted on a supporting framework 35. The preliminary mixing tank 34 preferably is provided with equipment for cooking or cooling and agitating the materials which equipment may be similar to the cooking, cooling and agitating equipment provided in the main tank 10. Thus the tank 34 is equipped with a centrally disposed, rotatable, mechanical agitator 36 comprising one or more blades 37 fixed to a shaft 38 journalled in bearings 39. A pulley 40 at the top of the shaft 38 is traversed by a belt 41 driven by a motor 42 supported on the tank 34. Within the tank 34 is a heating coil 43 through which a heating medium such as steam or a cooling medium may be passed under appropriate valve control. Pipes 44 and 45 extending into the tank 34 are equipped with downwardly facing nozzles 46 adapted to direct agitating jets of steam and compressed air respectively into the path of rotation of the blade or blades 37. The mechanical agitator 36 and the steam and air agitators 44 and 45 may be used individually or selectively in any desired combination or all may be used simultaneously.

After material has been given a preliminary heating or treatment and mixing in the tank 34 it may be discharged into the tank 10 through an outlet pipe 47 equipped with a cut-off valve 48. If desired the tank 34 may be equipped with a plug valve similar to the valve 14 described above with reference to the main tank 10.

Preferably each of the tanks 10 and 34 is equipped with a thermometer 49 and the main tank 10 may be equipped with a float-controlled liquid level gauge 50, although any other conventional or suitable type of liquid level gauge may be used. The tank 34 may also be equipped with liquid level indicating means (not shown). Water may be introduced into the preliminary mixing tank through a valve controlled pipe 51.

The outlet pipe 11 leading from the main tank 10 is equipped with a cut-off valve 52. A discharge nipple 53 is connected to the outlet pipe 11 between the valves 13 and 52. Flow of material through the nipple 53 and connected pipe is controlled by a valve 54. The nipple 53 and connected piping controlled by the valve 54 is especially advantageous when vegetables or pie fillings are to be cooked or processed because they enable the processed material to be led directly to a container or containers instead of being first delivered to storage tanks to be described hereinafter.

Connected to the hopper portion 12 of the outlet pipe 11 of the main tank 10 are inlet nozzles 55 and 56 each equipped with a control valve 57. The nozzles 55 and 56 are disposed at different elevations with the nozzle 55 being inclined downwardly toward the pipe 11 and the nozzle 56 being inclined upwardly toward the pipe 11. Fluid under pressure such as steam or compressed air may be supplied through either or both of the nozzles 55 and 56 for dislodging materials which do not flow readily and which clog or have a tendency to clog the hopper part 12. Ordinarily the valve 54 is closed and the valves 13, 14 and 52 are open so that batches of cooked or processed materials will be discharged from the main tank into a manifold or distributor pipe 58 communicating through branch pipes 59 with one or more of a plurality of storage tanks 60. Cut-off valves 61 in the distributing pipes 59 and valves 62 in the manifold 58 provide for the selective delivering of material to the respective storage tanks 60.

The storage tanks 60 may be open or closed at the top and except as to their size, being smaller than the main tank 10, they are otherwise equipped similarly to the main tank 10. Thus the tanks 60 are provided with coils 63 adapted to be supplied with a heating or cooling medium under valve control and are equipped with mechanical agitators 64 similar to the agitators 24 and 36 previously described. The agitators 64 may have any desired number of blades and may be driven from individual electric motors 65. Each tank 60 also is equipped with pipes 66 and 67 each of which may be equipped with downwardly directed nozzles (not shown) similar to the nozzles 33 and 46 previously referred to. The tanks 60 may also be provided with thermometers 68 and with liquid level indicating means (not shown).

The provision of the auxiliary or storage tanks 60 is particularly advantageous when processing certain foods which must be cooked rapidly or which, at the end of the day, have not been cooked or processed sufficiently. By delivering different mixes to different storage tanks 60 it is possible at a later time to continue the treatment of the different foods according to the necessities of the individual mixes. Thus certain batches which have been delivered to certain of the storage tanks 60 may be reheated the following day or even later so as to complete the processing and bring them to the temperatures required before being canned or sealed in other containers. Another advantage of using the separate storage tanks 60 is that certain basic mixes, for example, fountain syrup bases, may be divided and stored in the tanks 60 in separate batches, the batches cooled in their respective tanks 60 and the contents of each tank 60 then flavored differently.

The materials from the storage or auxiliary tanks 60 may be discharged through outlet pipes 68' equipped with suitable control valves 69. If desired, flow through the outlet pipes 68' may be controlled additionally by plug valves similar to the valve 14' with which the main tank 10 is equipped. Detachably, adjustably, and rotatably connected to the outlet pipes 68' are inlet sections 70 of U-shaped filling nozzles 71 each of which includes a plurality of tubes or nozzles 72 adapted to be inserted in containers 73 to be filled. The pipes or tubes 72 preferably are quite long so that they will extend well into the containers 73 with the bottoms of the pipes or tubes close to the bottoms of the containers so as to avoid turbulence and formation of foam, thus permitting more rapid filling of the containers 73.

While being filled the containers 73 are supported on a strip, platform, or conveyor 74 located beneath the storage tanks 60. The containers 73 are preheated and/or sterilized and are then cooled within a preheating and cooling chamber or equipment 75. The strip or conveyor 74 receives treated containers from the chamber 75 and conveys or directs them beneath the filling nozzles 72. When the member 74 is a moving conveyor it is given an intermittent feeding motion so that the containers may be held stationary while being filled.

The filled containers are transferred manually from the strip or conveyor 74 to a conveyor 76 which moves them to the right as viewed in Figure 1 into operative relation to a conventional capping machine 77. After the containers have been capped they are delivered to a power driven roller conveyor 78. For convenience of the operator one or more tables or platforms 79 for holding caps, materials, or accessories may be provided adjacent the conveyor 76 and the capping machine 77.

The roller conveyor 78 carries the capped containers through a washing and sterilizing apparatus generally designated A and which includes a hood 80 equipped with openings 81 in its ends through which the containers may be conveyed. Mounted within the hood 80 is piping 82 having variously directed discharge nozzles 83 for delivering hot water or steam at different angles upon containers being passed through the apparatus A. Hot water or steam is supplied through a pipe 84 under control of a valve 85 and thence through an inlet or branch pipe 86 connected to the piping 82. Hot water or condensate which may collect in a pan or tray 87 is returned to the pipe 86 by means of a pumping apparatus generally designated 88 and a return pipe 89. Thus the hot water may be re-circulated as desired and a fresh supply of hot water may be made available under the control of the valve 85.

After the containers 73 are washed and/or sterilized in the apparatus A they are carried by the conveyor 78 through a unit or apparatus B which is similar in construction to the apparatus A and which, therefore, need not be described in detail. The apparatus B is employed for cooling rather than heating or sterilizing the containers and is equipped with nozzles similar to the nozzles 83 in the unit A for discharging a cooling medium such as water onto the containers 73. The cooling medium preferably should be maintained at freezing temperature or only a little above freezing temperature by appropriate refrigerating apparatus (not shown). The cooling of the processed materials at this point is desirable especially when the materials comprise fruits, the cooling of which causes them to retain their original color. It will be apparent that the units A and B may be used jointly or separately and independently according to the nature of the material in the containers 73.

After the containers 73 are moved through and beyond the unit B the conveyor 78 discharges them onto a conveyor 90 which moves them past a labeling machine 91 which may be of any conventional type. Preferably a platform or table 92 for holding a supply of labels or other accessories or materials is positioned adjacent the conveyor 90 and the labeling machine 91. When the containers 73 have been carried to the discharge end of the conveyor 90, at the left in Figure 1, they are placed manually on a return conveyor 93 which travels at a level lower than the conveyors 76 and 90. The conveyor 93 then delivers the containers to a point between the conveyor 76 and the container filling station so as to be conveniently removable by an attendant.

All of the conveyors 74, 76, 78, 90 and 93 preferably are adjustable as to width and elevation and the conveyor 76 is at least as long as the series of storage tanks 60.

When manufacturing jelly the filling nozzles 71 are detached from the pipes 68 and are replaced by long flexible hose. The free or discharge ends of the hose are inserted in barrels and preferably are provided with conventional nozzles adapted to cut off automatically when pressure is released on a valve opener. The barrels preferably are moved on a conveyor because in the manufacture of barreled jelly only a small amount of jelly can be placed in a barrel or container at one time and then must be allowed to harden or set until the next layer is placed on top of it.

The apparatus disclosed herein embodies the invention in the form now preferred but it will be understood that changes may be made without departing from the invention as defined in the claim.

I claim:

Apparatus of the class described comprising a main tank, a mixing tank above said main tank having a valved discharge pipe arranged over the main tank, mechanical agitating means in each tank, controls on the respective tanks geared to said agitating means, means in each tank adjacent its bottom to discharge air under pressure downwardly to function dually as a processing aid and for agitating purposes, and means in each tank adjacent its bottom to discharge steam downwardly to function dually as a processing aid and for agitating purposes, and outlet means from the main tank having an upright operating stem disposed out of the path of said mechanical agitating means and relatively close to the said wall of the main tank.

WILTZ W. WAGNER.

REFERENCES CITED

The following references are of record in the file of this patent:

UNITED STATES PATENTS

| Number | Name | Date |
|--------|------|------|
| 155,980 | Schimper et al. | Oct. 13, 1874 |
| 256,809 | Roat | Apr. 18, 1882 |
| 288,333 | Hayes | Nov. 13, 1883 |
| 475,784 | Martin | May 31, 1892 |
| 493,342 | Rach | Mar. 14, 1893 |
| 528,680 | Odin | Nov. 6, 1894 |
| 739,350 | Rutter | Sept. 22, 1903 |
| 840,370 | Rach | Jan. 1, 1907 |
| 1,911,579 | McNeil | May 30, 1933 |
| 1,912,278 | Key | May 30, 1933 |
| 1,990,779 | Eberts | Feb. 12, 1935 |
| 2,335,052 | Glocker | Nov. 23, 1943 |